No. 706,002. Patented Aug. 5, 1902.
G. G. ALLEN.
KEYBOARD.
(Application filed Nov. 11, 1896.)
(No Model.)

Witnesses:
J. M. Fowler Jr
S. Johnson

Inventor:
George Gillespie Allen
J. J. F. Johnson
Attorney.

UNITED STATES PATENT OFFICE.

GEORGE GILLESPIE ALLEN, OF MALDEN, MASSACHUSETTS, ASSIGNOR TO STENOTYPE COMPANY, OF PORTLAND, MAINE, A CORPORATION OF MAINE.

KEYBOARD.

SPECIFICATION forming part of Letters Patent No. 706,002, dated August 5, 1902.

Application filed November 11, 1896. Serial No. 611,760. (No model.)

*To all whom it may concern:*

Be it known that I, GEORGE GILLESPIE ALLEN, a citizen of the United States, residing at Malden, in the county of Middlesex and State of Massachusetts, have invented certain new and useful Improvements in Keyboards; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in keyboards for use in connection with all devices, both mechanical and electric, wherein a keyboard or similar mechanism is necessary or convenient for operation, such as type-writing, type-setting, linotype, and matrix-making machines.

The invention has for its object the provision of a keyboard having its surface divided into sections or spaces, each of which sections or spaces has a different tint or color. In each colored space or section is a predetermined number of keys arranged with reference to their frequency and convenience in use, the keys of the keyboard being so grouped that the color or the name of the color of the space or section will suggest mnemonically or phonetically certain letters, characters, symbols, or representations of speech-sound, or combinations of such, as will more fully appear from the subjoined description.

In my patent dated December 11, 1900, and numbered 663,405 I have disclosed a keyboard having its keys arranged in the same manner as in this present application, the distinction being that in said patent the various groups of associated letters are separated mechanically by means of slightly-raised frets or partitions; but in my present application the various groups are differentiated by colors suggestive of the characters embraced in the groups.

Figure 1:
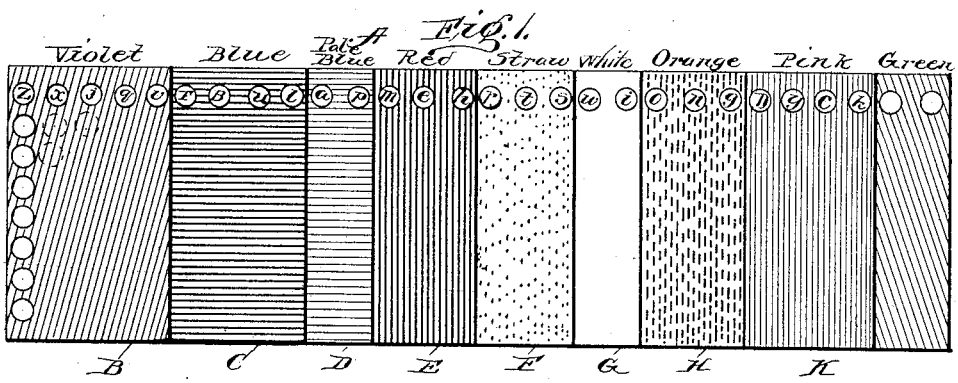
Figure 2:
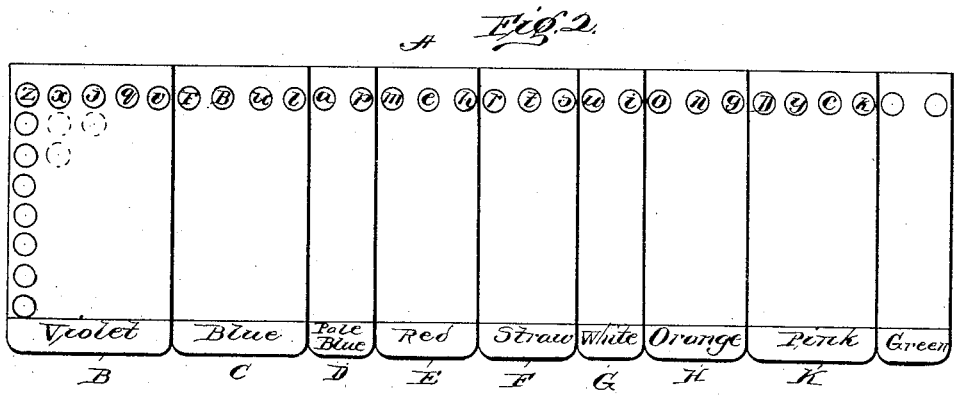
Figure 3:
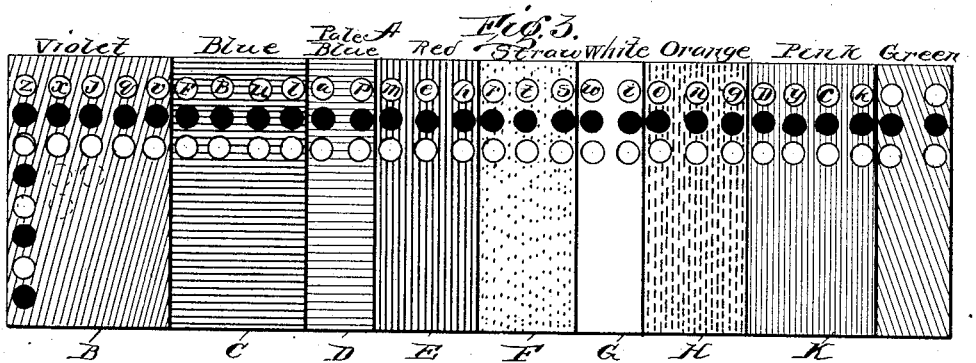

In the drawings, Figure 1 is a plan view of my improved keyboard having the colored spaces or sections thereof indicated thereon, showing the grouping of certain characters on certain colors and the relative arrangement of keys in the individual group. Fig. 2 is a figure similar to Fig. 1, having the color of a section indicated at one end thereof by an indicator. Fig. 3 is a similar view to Fig. 1, showing the keys arranged in longitudinal rows and marked in such manner as to form a guide for the eye of the operator to facilitate the selection of the desired keys.

The letter A indicates the body of the keyboard, and B, C, D, E, F, G, H, I, and K colored spaces or sections thereon. These sections or spaces extend across the board and are of the same length, as shown, and of varying width, depending upon the number of keys or characters or speech-sound symbols set therein. After trials of various groups and combinations I have selected the following groups or combinations of letters, characters, speech-sound symbols, or combinations thereof as the most convenient for use and the colors upon which they are placed as the most suggestive of the combinations or groups: The first group of letters, characters, or speech-sound symbols, "z, x, j, q, v," being little used I place them at one side of the keyboard upon a "violet-colored" space or section, the name "violet" suggesting the letter "v" therein, which will have associated with it mnemonically "z, x, j, q," the next group, "f, b, l, u," being phonetically suggested by the name of the color, "full blue," upon which color they are placed. The letters "p, a" of the next group are phonetically suggested by the word "pale," and as this section follows the "blue" space the color "pale blue" is selected, upon which they are placed as their characteristic color. Red, the space or section color of the next group mnemonically suggests the letters "h, e, m," the "e" being the central letter of each word. A "straw" color readily suggests, phonetically, to us the group or assemblage "s, t, r." The group "w, i" is suggested by "white" color, while the group "o, n, g" is readily associated, phonetically as well as otherwise, with the "orange" color. The group "d, y, c, k," consisting of characters so little in use, is set at the end of the board opposite the first group and is placed upon a "pink" ground, the "k" in "pink" suggesting the "k" in this combination or group and the other letters being mnemonically associated with the letter "k." If desired, punctuation-points and other characters and symbols may be added to the keyboard, as shown, or be omitted at choice.

Instead of having the sections or spaces colored, as indicated in Fig. 1, the color may be indicated at the top or bottom of the section or space, as indicated in Fig. 2. It will also be apparent that instead of the sections or spaces being colored the keys themselves may be colored.

The letters, characters, and speech-sound symbols or representations are arranged on the colored spaces in the positions most convenient for their practical selection or use. I do not desire to confine myself to the exact grouping of characters, &c., shown, nor do I desire to confine myself to the use of the colors indicated, my chief object being to locate by colors and positions certain assemblages or combinations of characters, &c., that shall in some manner be suggested by the colors, association of certain letters, or phonetically, mnemonically, or otherwise. The combinations herein illustrated, it would seem after careful study and experiment, are the most convenient and practical.

The keys are arranged on the board in rows, preferably parallel both longitudinally and transversely, as shown. Each row contains a complete alphabet or set of characters or speech-sound symbols. Like letters or characters of each group in the same colored space or section are arranged in the same sequence and directly beneath each other, as is evident, so that each transverse row will have or be composed of an individual character or speech-sound symbol.

The object of having two or more rows of complete sets of characters or speech-sound symbols, &c., is to enable the operator to select a number of such characters simultaneously for the composition of a word or part of a word or even in some instances a phrase. In selecting a number of characters simultaneously the first character must be selected in the first row, the second in the second row, the third in the third row, &c. For example, if the keys for the letters "w" in the first row, "h" in the second row, "a" in the third row, and "t" in the fourth row were simultaneously operated the machine to which the board would be attached would produce the word "what" at the proper time and place. In this way keys for combinations of characters and words can be simultaneously operated without interfering with one another, and it will also be evident that word-keys may be placed on the board, if so desired.

By this invention the necessity for lettering all the keys is obviated. The first row of keys may be lettered, if desired, or characterized by distinguishing-marks for the convenience of the beginner; but the operator at the outset will memorize the different groups, identify them by their colors, and locate the letters or characters therein by their arrangement in the group irrespective of any lettering or other distinguishing-marks in the said keys. By this invention the operator is soon enabled to operate the keyboard without looking at the keys, and almost immediately acquires a knowledge of and familiarity with the board which would require months of study and practice to attain with the ordinary keyboard, in which each key has to be located exclusively by the character it bears, whereby greater speed in writing or selecting and operating the keys is attained. Further, by the practical application of this invention the keys can be made very small and arranged quite close together without confusing the operator, decreasing the size of the board, and thereby making it more wieldable, and may be applied either to a mechanical or electric keyboard without departing from the spirit of the invention.

This invention may be applied to any keyboard, but is particularly designed for use on keyboards wherein more than a single alphabet is used. The keyboard herein described was especially designed for use in connection with linotype-machines—such, for instance, as is shown in the patent to Charles Elmer Allen, dated June 23, 1896, No. 562,563—and is electrically connected with said machine in the manner therein shown.

Having described my invention, what I claim is—

1. A keyboard comprising a plurality of keys arranged in parallel rows, each row being a duplicate of the other and divided into a series of sections indicated by different colors, and the name of each color being indicative of the letters grouped therein, whereby a glance at any color suggests to the operator the letters embraced therein, and it is unnecessary to mark every key with the character it represents, substantially as set forth.

2. A keyboard comprising a plurality of keys arranged in parallel rows, each row being a duplicate of the other and divided into a series of groups, and a background for said keys composed of sections each differently colored from the others, the name of each color being indicative of the letters grouped therein, substantially as set forth.

3. A keyboard comprising a plurality of keys arranged in parallel rows, each row being a duplicate of the other and the keys being arranged in groups; and a background for said keys divided into sections corresponding with said groups, the name descriptive of the surface of each section being indicative of the letters grouped therein, substantially as set forth.

4. A keyboard comprising a plurality of keys arranged in groups indicated by different colors, the characters in each group being suggested phonetically by the name of the color associated therewith.

In testimony whereof I affix my signature in presence of two witnesses.

GEORGE GILLESPIE ALLEN.

Witnesses:
F. T. F. JOHNSON,
L. L. JOHNSON.